(12) United States Patent
Lee et al.

(10) Patent No.: US 8,019,021 B2
(45) Date of Patent: Sep. 13, 2011

(54) CARRIER TO INTERFERENCE AND NOISE RATIO (CINR) ESTIMATING METHOD AND DEVICE USING PREAMBLE IN ORTHOGONAL FREQUENCY DIVISION MULTIPLEXING (OFDM)

(75) Inventors: Yu-Ro Lee, Daejeon-si (KR); Dong-Seung Kwon, Daejeon (KR)

(73) Assignees: Samsung Electronics Co., Ltd, Suwon-si (KR); Electronics and Telecommunications Research Institute, Daejeon (KR); KT Corporation, Seongnam (KR); SK Telecom Co., Ltd, Seoul (KR); Hanaro Telecom, Inc., Seoul (KR)

( * ) Notice: Subject to any disclaimer, the term of this patent is extended or adjusted under 35 U.S.C. 154(b) by 849 days.

(21) Appl. No.: 12/064,115

(22) PCT Filed: Aug. 18, 2006

(86) PCT No.: PCT/KR2006/003258
§ 371 (c)(1),
(2), (4) Date: Feb. 19, 2008

(87) PCT Pub. No.: WO2007/021159
PCT Pub. Date: Feb. 22, 2007

(65) Prior Publication Data
US 2008/0240217 A1 Oct. 2, 2008

(30) Foreign Application Priority Data

Aug. 19, 2005 (KR) .................. 10-2005-0076383
Nov. 8, 2005 (KR) .................. 10-2005-0106540

(51) Int. Cl.
*H04L 27/00* (2006.01)
(52) U.S. Cl. .................. 375/324; 329/311; 455/214

(58) Field of Classification Search ............. 375/324; 329/311; 455/214
See application file for complete search history.

(56) References Cited

U.S. PATENT DOCUMENTS 7,711,386 B2 * 5/2010 Sung et al. .................. 455/522
(Continued)

FOREIGN PATENT DOCUMENTS

EP          1-555-761 A1      7/2005
(Continued)

OTHER PUBLICATIONS

Burke, "CDMA reverse link spatial combining gains: optimal vs. MRC in a faded voice-data system having a single dominant high data user" 2001 GLOBECOM '01 IEEE Global Telecommunications Conference, vol. 1, Publication Year: 2001, pp. 264-268 vol. 1.*

(Continued)

*Primary Examiner* — Juan Torres
(74) *Attorney, Agent, or Firm* — Jefferson IP Law, LLP

(57) ABSTRACT

A device and a method for estimating a Carrier to Interference-plus-Noise Ratio (CINR) in an Orthogonal Frequency Division Multiplexing (OFDM) system are provided. The CINR estimating method includes receiving a preamble symbol and transmitting subcarrier transmitted from a base station, calculating an interference power and noise power using the preamble symbol and transmitting subcarrier, calculating a receive power used for the base station to transmit a preamble and data symbol, estimating a preamble CINR value using an interference power, a noise power, and a receive power, calculating the noise power from a subcarrier not transmitting a preamble, and calculating an average CINR of data subcarriers using the preamble CINR value and the noise power. Accordingly, a precise CINR can be estimated using a preamble when the preamble power is amplified in comparison with the data symbol power.

25 Claims, 13 Drawing Sheets

U.S. PATENT DOCUMENTS

| | | | |
|---|---|---|---|
| 2002/0110138 A1* | 8/2002 | Schramm | 370/430 |
| 2003/0223354 A1 | 12/2003 | Olszewski | |
| 2004/0141481 A1* | 7/2004 | Lee et al. | 370/335 |
| 2005/0152480 A1* | 7/2005 | Chang et al. | 375/343 |
| 2005/0201295 A1* | 9/2005 | Kim et al. | 370/241 |
| 2005/0288020 A1* | 12/2005 | Cho et al. | 455/436 |

FOREIGN PATENT DOCUMENTS

| | | | |
|---|---|---|---|
| KR | 10-2004-0110342 A | 12/2004 | |

OTHER PUBLICATIONS

IEEE, Draft IEEE Standard for Local and metropolitan area networks Corrigendum to IEEE Standard for Local and Metropolitan Area Networks—Part 16: Air Interface for Fixed Broadband Wireless Access Systems IEEE P802.16-2004/Cor1/D5 (Draft Corrigendum to IEEE Std 802.16-2004), Sep. 12, 2005. This document can be found at http://ieeexplore.ieee.org/.*

Maeda et al., Experimental Evaluation of Throughput Performance in Broadband Packet Wireless Access Based on VSF-OFCDM and VSF-CDMA, 2003, IEEE, pp. 6-11.

Sandrine Boumard, Novel Noise Variance and SNR Estimation Algorithm for Wireless MIMO OFDM Systems, GLOBECOM, 2003, IEEE, pp. 1330-1334.

Junghoon Lee, Jaewon Chang, and Wonjin Sung, Performance Improvement of Channel Estimation Based on Pilot Structure Variations for Cellular OFDMA Systems, 2004, IEEE, pp. 989-993.

* cited by examiner

CARRIER TO INTERFERENCE AND NOISE RATIO (CINR) ESTIMATING METHOD AND DEVICE USING PREAMBLE IN ORTHOGONAL FREQUENCY DIVISION MULTIPLEXING (OFDM)

BACKGROUND OF THE INVENTION (a) Field of the Invention

The present invention relates to a carrier to interference-plus-noise ratio (CINR) estimating method and device of an orthogonal frequency division multiplex (OFDM) scheme. More particularly, the present invention relates to a device and method thereof that are capable of efficiently estimating the CINR when a preamble subcarrier or a pilot subcarrier transmit power is different from a data subcarrier transmit power in the OFDM system, the respective base stations uses preamble subcarriers whose positions are different, or a data area is partially loading.

(b) Description of the Related Art

In a fourth generation mobile communication system requiring high capacity data transmission such as a wireless local area network (WLAN), wireless broadcasting, or Digital Multimedia Broadcasting (DMB), the OFDM system has been used so as to transmit wideband high speed data. The OFDM system divides a bandwidth into a plurality of subcarrier and transmits the divided bandwidth, and the basic function of OFDM is to convert serially input data streams into N parallel data items, respectively load the N parallel data items on the independent subcarriers, and transmit them so as to increase a data rate.

FIG. 1 is a block diagram of a data transmitting/receiving system using an OFDM system.

An OFDM transmit system includes an encoder 102, a serial/parallel (S/P) converter 104, a preamble or pilot generator 106, a multiplexer 108, an inverse fast Fourier transform (IFFT) converter 110, a parallel/serial (P/S) converter 112, and a digital/analogue (D/A) converter and filter 114, and a receive system includes an analogue/digital (A/D) converter and filter 116, an S/P converter 118, a fast Fourier transform (FFT) converter 120, a demultiplexer 122, a preamble or pilot extractor 124, a P/S converter 126, and a decoder 128.

The encoder 102 modulates data to be transmitted into a desired modulation scheme, for example, binary phase shift key (BPSK), quadrature phase shift key (QPSK), 16 QAM (Quadrature Amplitude Modulation), and 64 QAM schemes.

The S/P converter 104 converts serially received high-speed data into low-speed parallel data, and the preamble or pilot generator 106 generates a pilot or preamble to be loaded on the transmit data. The multiplexer 108 multiplexes the transmit data received from the S/P converter 104 with the preamble or pilot generated by the preamble or pilot generator 106.

The IFFT converter 110 converts the multiplexed data into time-axis signals, and the P/S converter 112 converts the parallel signal into serial data and adds a cyclic prefix to a front of the converted data.

The D/A converter and filter 114 converts a digital format of the transmit data that is converted into the serial signal by the P/S 112 into an analog signal, filters the converted data, and transmits the same to an antenna of an RF unit.

An antenna of the receiving system receives the transmitted analog signal, and the A/D converter and filter 116 filters and converts the analog signal into the digital signal. The S/P converter 118 eliminates the cyclic prefix and converts the digital signal into the parallel signal and transmits the converted signal to the FFT converter 120, the FFT converter 120 performs a Fourier transform on the transmitted parallel signal and transmits the transformed signal to the demultiplexer 122, the demultiplexer 122 demultiplexes the data, and then the preamble or pilot extractor 124 separates a preamble or pilot signal from the data. The P/S converter 126 converts the separated parallel data signal into the serial signal. The decoder 128 demodulates data using a channel estimating value estimated by the preamble or pilot signal extracted from the preamble or pilot extractor 124.

FIG. 2 is a block diagram of a data transmitting/receiving system using an OFDM system.

The data multiplexed in the multiplexer 108 and transmitted to the receiving system includes a data symbol directly including the preamble and the data.

The preamble includes frame synchronization, cell search, time/frequency synchronization, and channel estimating information. Generally, the preamble is placed at the front of the frame, but it may be placed at the middle or rear thereof.

A mobile communication system such as a high-speed downlink packet access (HSDPA) and an evolution data only (1x EV-DO) system adopts an adaptive modulation and coding scheme (AMC) that is capable of changing the modulation scheme and a channel coding rate according to a channel environment, so as to increase a data rate, and has various modulation and coding scheme (MCS) levels that are selectable according to the channel environment. At this time, in order to select an accurate MCS level, instantaneous channel CINR is estimated.

The CINR may be directly estimated using data, and it may be indirectly estimated using a preamble by applying the preamble to the data area.

FIG. 3 is a block diagram for showing a conventional CINR estimating algorithm.

According to the conventional CINR estimating method using a preamble, differences between adjacent subcarriers using an operator are obtained from the receive signal $r_m$ (S302), the differences are averaged to estimate an interference power (S304), and the inverse estimated interference power is obtained (S306).

In addition, a predetermined number of moving averages are calculated from the received signal (S308), and the moving averages are averaged to estimate a signal power (S310). In addition, the CINR is calculated from the signal power and the interference power estimated through S306 to S310 (S312).

According to the CINR calculating method using data, the high CINR area has good accuracy. However, the low CINR area in which the received data reliability is deteriorated has considerably reduced accuracy.

In addition, according to the CINR calculating method using a preamble, good CINR estimating accuracy is provided. However, the respective base stations must have a preamble sequence placed on the subcarriers having the same position, and also errors may occurs at the high CINR area when the preamble transmit power is different from the data transmit power.

The preamble has all adjacent cells always transmitted, and accordingly it is used to estimate the CINR to thereby determine the data area MCS. However, in the case of partial loading, that is, the adjacent cells partially use a subcarrier, the preamble CINR is always less than that of the real data area. Accordingly, an optimum MCS level cannot be determined.

FIGS. 4 and 5 illustrate preamble sequence allocation in which a subcarrier transmits a preamble in a cellular system.

FIG. 4 illustrates a cellular system having a cell 0 including a receiver for receiving data and six adjacent cells, in which receive signals are interfered with by the adjacent cells.

OFDM uses various preamble and data area subcarrier allocation methods. Generally, the preamble is transmitted every N number of subcarriers, is selected at a sequence having a low peak to average power ratio (PAPR), and is transmitted while amplifying the power in comparison with the data symbol.

In FIG. 5, the preamble sequence is transmitted every 4 subcarriers. The subcarrier transmission interval or a start point of the transmitted subcarrier may be variously established. At this time, $P_m^q(n)$ is given as the preamble sequence used at the respective base stations, q is given as a cell number, m is given as a subcarrier number, and n is given as a symbol number.

As shown in FIG. 5, when the preamble is used at the same subcarriers for all the cells, and the preamble transmission power is the same as the data transmission power, the CINR can be accurately estimated. However, when the preamble transmission power is amplified to be greater than the data transmission power, in the case of the high CINR area, an error occurs between the CINR estimated at the preamble and the CINR of the data symbol.

In order to enhance cell search performance or channel estimating performance using a preamble, the respective cells can use the subcarriers differently within the preamble symbol. Such a method has been applied to the IEEE 802.16 (a wideband wireless communication standard). There is a problem in that the CINR value estimated using a subcarrier is different from the data area CINR value determined when all the subcarriers are used, when the subcarriers of the preambles used in the respective cells are different.

FIGS. 6 and 7 respectively illustrate a cellular system in which a preamble sequence is allocated when respective cells transmit a preamble using a different subcarrier.

FIG. 6 illustrates segments having a segment a, a segment b, and a segment c used at preambles of the respective cells using IEEE 802.16.

In addition, FIG. 7 illustrates subcarriers using preambles at a cell structure used in FIG. 6. The interference to be estimated at the preamble structure can only estimate Cell 2, Cell 4, and Cell 6 when such subcarriers are used. Therefore, the interference of Cell 1, Cell 3, and Cell 5 may not be estimated, and the preamble CINR may be estimated to be higher than the CINR of the real data area. Accordingly, there is a problem in that such an error is variously changed according to the segments used at the preamble.

In addition, there is a problem in that an error occurs between the CINR using the preamble and the data area CINR when the data area is partially loaded since the CINR estimating method using the preamble does not regard the data loading, and it is performed if the subcarriers are always allocated for all the data areas.

In order to measure a signal-to-noise ratio (SNR) in such an OFDM system, Korea Patent Application No. 10-2003-0039580 entitled "A Signal-to-noise ratio (SNR) Measuring Method and Apparatus using a Repeated Signal in an OFDM", an IEEE PIMRC paper entitled "Experimental Evaluation Throughput Performance in Broadband Packet Wireless Access Based on VSF-OFCDM and VSF-CDMA" (2003), and an IEEE GLOBECOM paper entitled "Novel Noise Variance and SNR Estimation Algorithm for Wireless MIMO OFDM" (2003) disclose a signal-to-noise ratio (SNR) measuring method using a repeated signal, two adjacent subcarriers of a pilot symbol, and two consecutive training symbols. However, the CINR has not been estimated when the subcarriers used by the preambles of the respective cells are different and the data are partially loading.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide a CINR estimating method and device of an OFDM system having advantages of efficiently estimating the CINR when a transmit power of a preamble subcarrier or pilot subcarrier is different from a transmit power of a data subcarrier in the OFDM system, when the preamble subcarrier is used at different positions of the respective base stations or when a data area is partially loading.

An exemplary CINR estimating method according to an embodiment of the present invention estimates a carrier to interference-plus-noise ratio (CINR) when a preamble symbol transmit power is amplified in comparison with a data symbol transmit power, and there are subcarriers not transmitting a preamble at a receiver of an orthogonal frequency division multiplex (OFDM) system. The CINR estimating method includes (a) receiving the preamble symbol and transmit subcarrier transmitted from the base station and calculating an interference power, a transmit subcarrier noise power, and a receive power, the receive power given as a power value used to transmit a preamble and data symbol at a base station; (b) estimating a CINR value of the preamble using the interference power, the transmit subcarrier noise power, and the receive power; (c) calculating a non-transmit subcarrier noise power from a subcarrier not transmitting the preamble; and (d) calculating an average of the CINR using the CINR value of the preamble and the non-transmit subcarrier noise power.

In addition, another exemplary CINR estimating method according to an embodiment of the present invention estimates a carrier to interference-plus-noise ratio (CINR) when a preamble symbol transmit power is amplified in comparison with a data symbol transmit power, and all the subcarriers are used to transmit a preamble at a receiver of an orthogonal frequency division multiplex (OFDM) system. The CINR estimating method includes (a) receiving the preamble symbol and transmit subcarrier transmitted from the base station and calculating an interference power, a transmit subcarrier noise power, and a receive power, the receive power given as a power value used to transmit a preamble and data symbol at a base station; (b) estimating a CINR value of the preamble using the interference power, the transmit subcarrier noise power, and the receive power; (c) calculating a null subcarrier noise power using a null subcarrier so as to reduce interference of adjacent bands; and (d) calculating an average CINR of the data subcarrier using a CINRT of the preamble and the null subcarrier noise power.

In addition, another exemplary CINR estimating method according to an embodiment of the present invention estimates a carrier to interference-plus-noise ratio (CINR) when the respective base stations transmit a preamble from different transmission positions at a receiver of an orthogonal frequency division multiplex (OFDM) system. The CINR estimating method includes (a) respectively calculating an interference power from adjacent cells having the same segment value as that of the base station including the receiver and adjacent cells having a different segment value; (b) estimating a CINR of an entire interference, a noise power, and a preamble from the respective calculated interference powers;

(c) calculating a null subcarrier noise power using a null subcarrier so as to reduce respective interferences of adjacent bands; and (d) calculating an average CINR of the data subcarrier using a CINR of the preamble and the null subcarrier noise power.

Another exemplary CINR estimating method according to an embodiment of the present invention estimates a carrier to interference-plus-noise ratio (CINR) when traffic of a data area is partially loading at a receiver of an orthogonal frequency division multiplex (OFDM) system. The CINR estimating method includes (a) calculating adjacent cell interference powers at a base station including the receiver using subcarriers not allocated to other receivers; (b) calculating an interference power and noise power using the preamble symbol and the subcarrier; (c) estimating the CINR of the preamble using the interference power and the noise power; and (d) calculating a CINR of the partially loaded data area using the interference power, the noise power, and the CINR of the preamble.

Another exemplary CINR estimating method according to an embodiment of the present invention estimates a carrier to interference-plus-noise ratio (CINR) in an orthogonal frequency division multiplex (OFDM) system, wherein the CINR estimating device includes a transmit subcarrier interference and noise power estimator for estimating a transmit subcarrier interference power and a transmit subcarrier noise power using a received preamble symbol or a subcarrier; a receive power estimator for calculating a receive power used to transmit the preamble symbol and data symbol; a noise/interference power estimator for calculating an interference power and a noise power using at least one of subcarriers not transmitting the preamble symbol, null subcarriers, or subcarriers that the base station does not allocate to other receivers; a preamble CINR estimator for estimating a preamble CINR value using the noise power, the interference power, and the receive power; and a data subcarrier CINR estimator for estimating a CINR of a data area using the preamble CINR value, the noise power, or interference power estimated by the noise/interference power estimator.

DETAILED DESCRIPTION OF THE EMBODIMENTS

Figure 1:
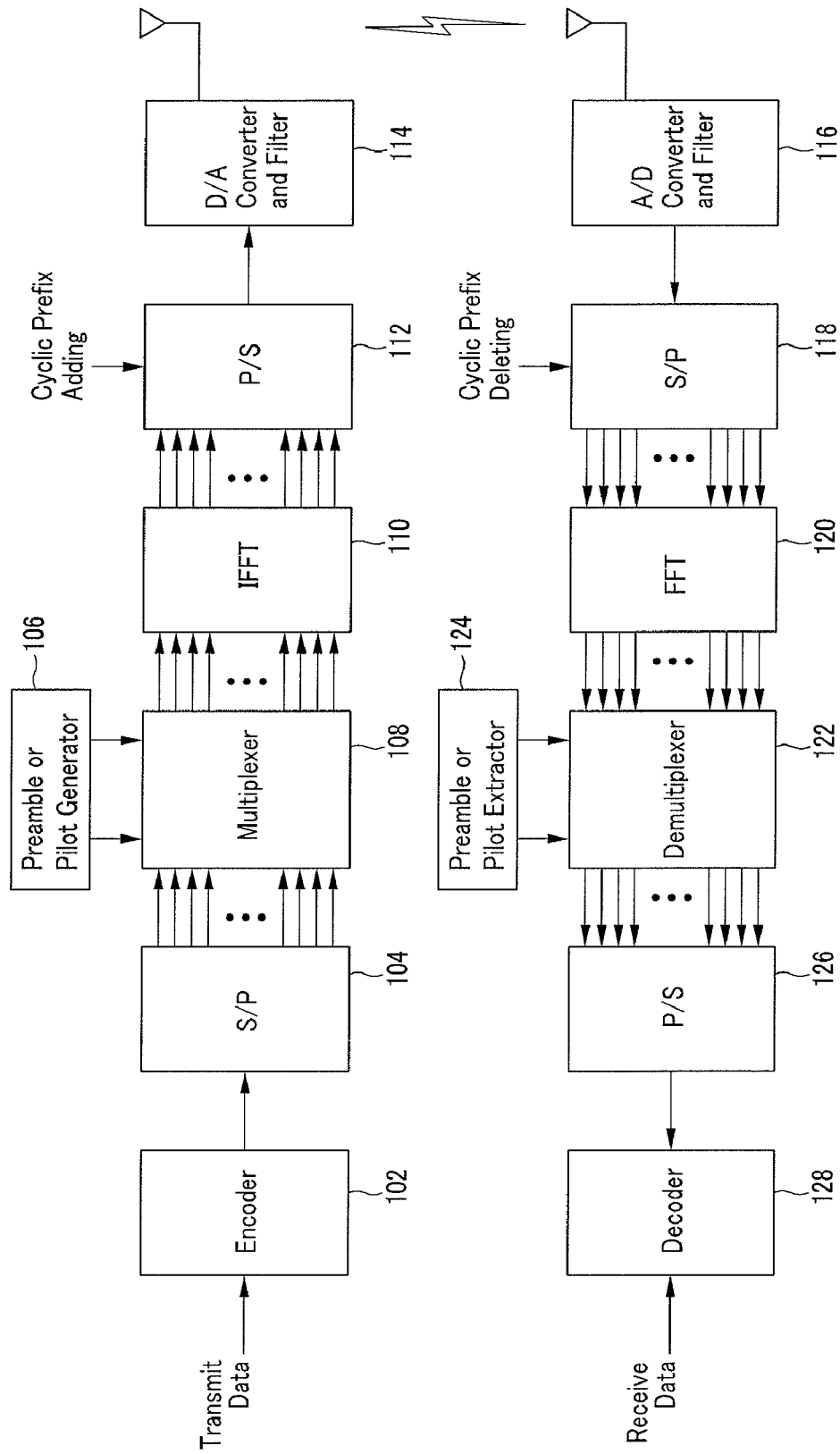
FIG. 1 is a block diagram of a data transmitting/receiving system using an OFDM system.
Figure 2:
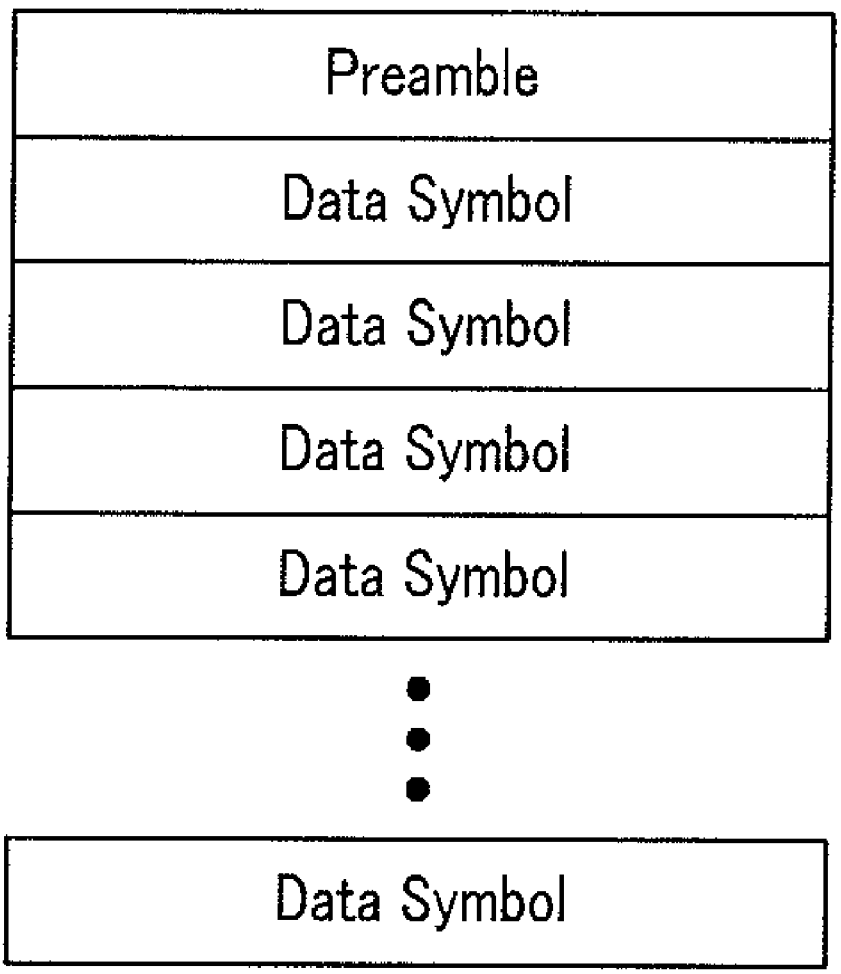
FIG. 2 is a block diagram of a data transmitting/receiving system using an OFDM system.
Figure 3:
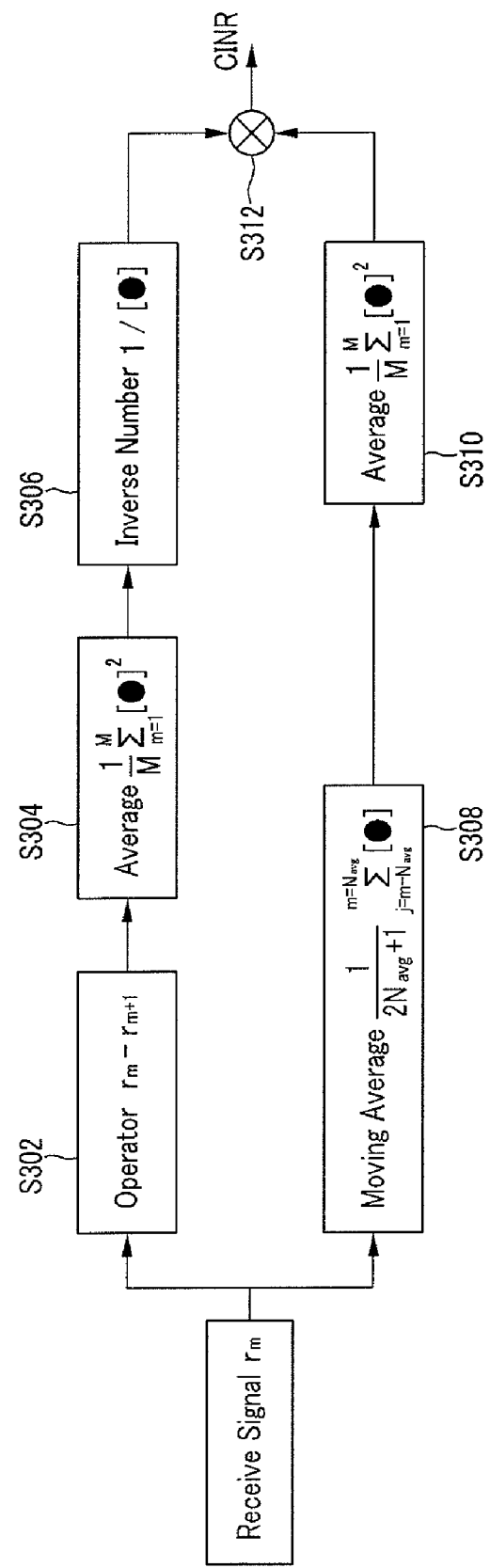
FIG. 3 is a block diagram for showing a conventional CINR estimating algorithm.
Figure 4:
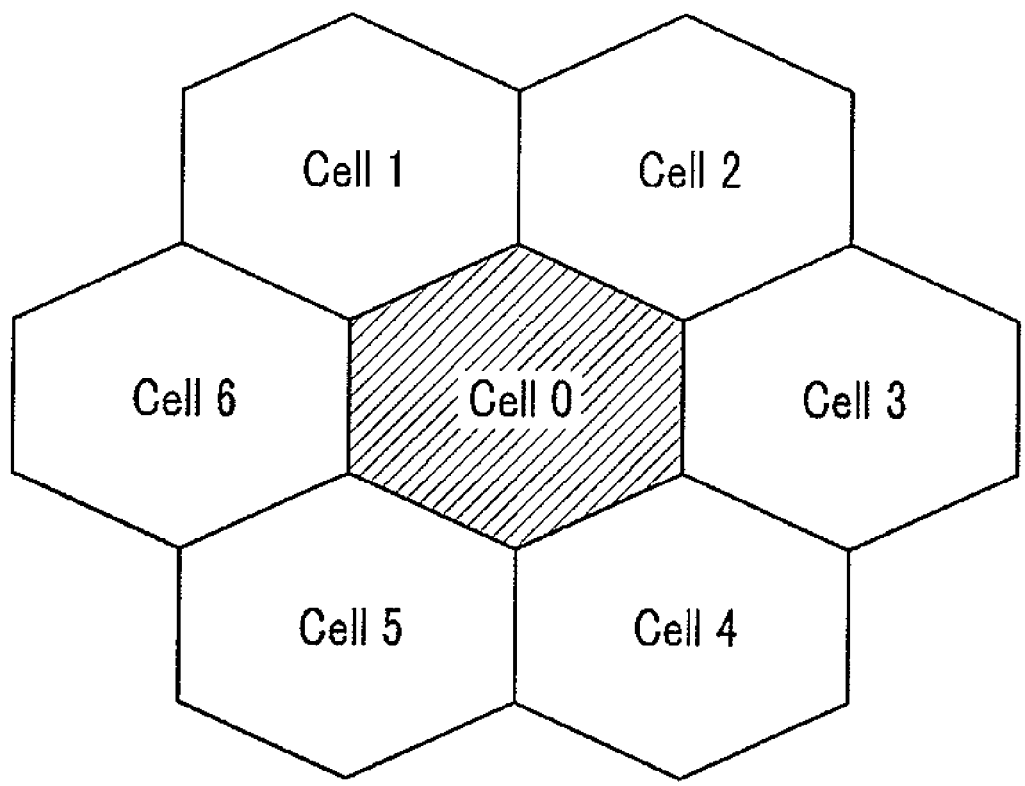
FIGS. 4 and 5 illustrate preamble sequence allocation in which a subcarrier transmits a preamble in a cellular system.

An exemplary embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

A method for obtaining a receive signal considering adjacent cell interference of a data area is given as Equation 1.

$$r_m(n) = \sum_{q=0}^{Q-1} \sqrt{P_D}\, d_m^q(n) h_m^q(n) + w_m(n) \quad \text{(Equation 1)}$$

In Equation 1, Q is given as a total number of base stations, $P_D$ as a transmit power of a data subcarrier, $d_m^q(n)$ as data of an n-th symbol of an m-th subcarrier of a q-th base station, $h_m^q(n)$ as a channel of an n-th symbol of an m-th subcarrier of a q-th base station, and $w_m(n)$ as a noise of an n-th symbol of an m-th subcarrier.

When a preamble power is amplified in comparison with a data symbol power there are two ways of estimating a data area CINR using a preamble, i.e., using a preamble having a subcarrier not to be transmitted, or using all the preamble subcarriers.

Figure 8:
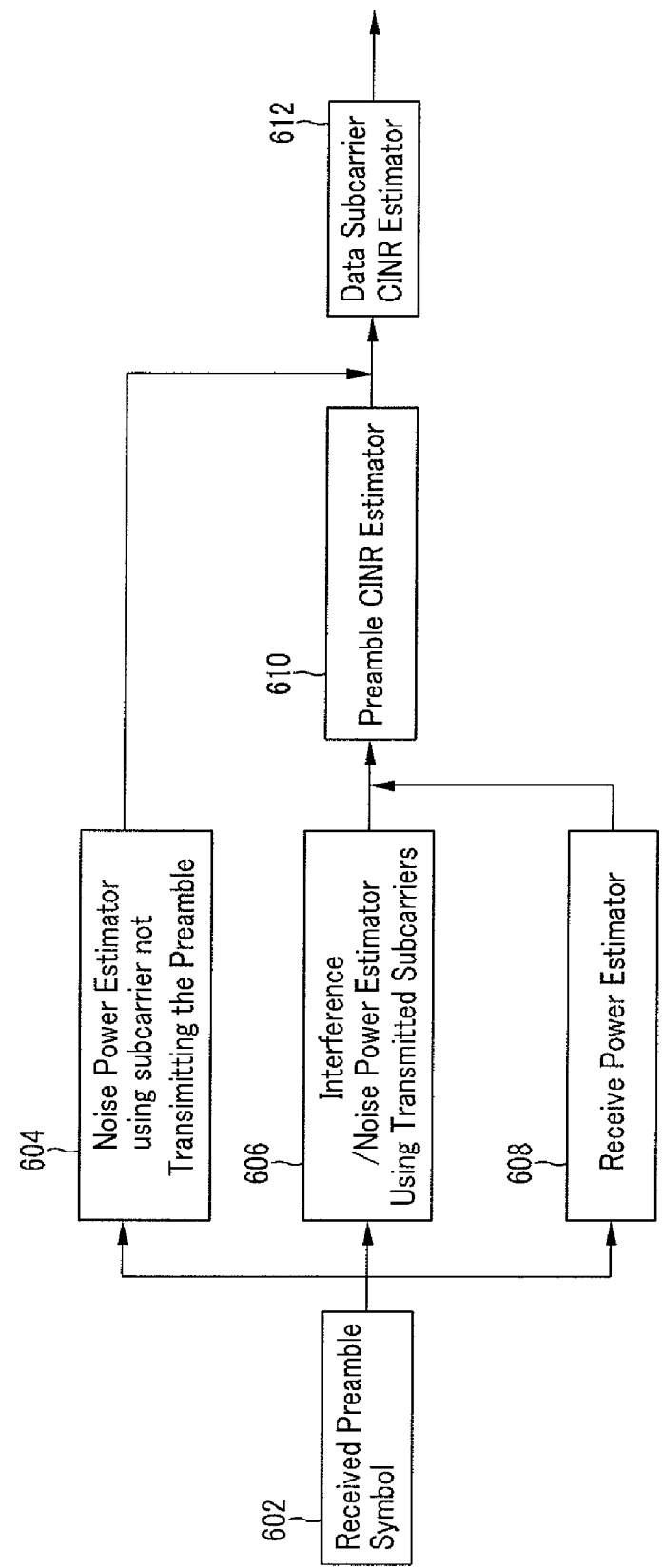
FIG. 8 is a block diagram for estimating a CINR when a preamble power is amplified in comparison with a data symbol power and a preamble has non-transmitted subcarriers.

FIG. 8 is a block diagram for estimating a CINR when a preamble power is amplified in comparison with a data symbol power, and a preamble has subcarriers not to be transmitted.

Figure 5:
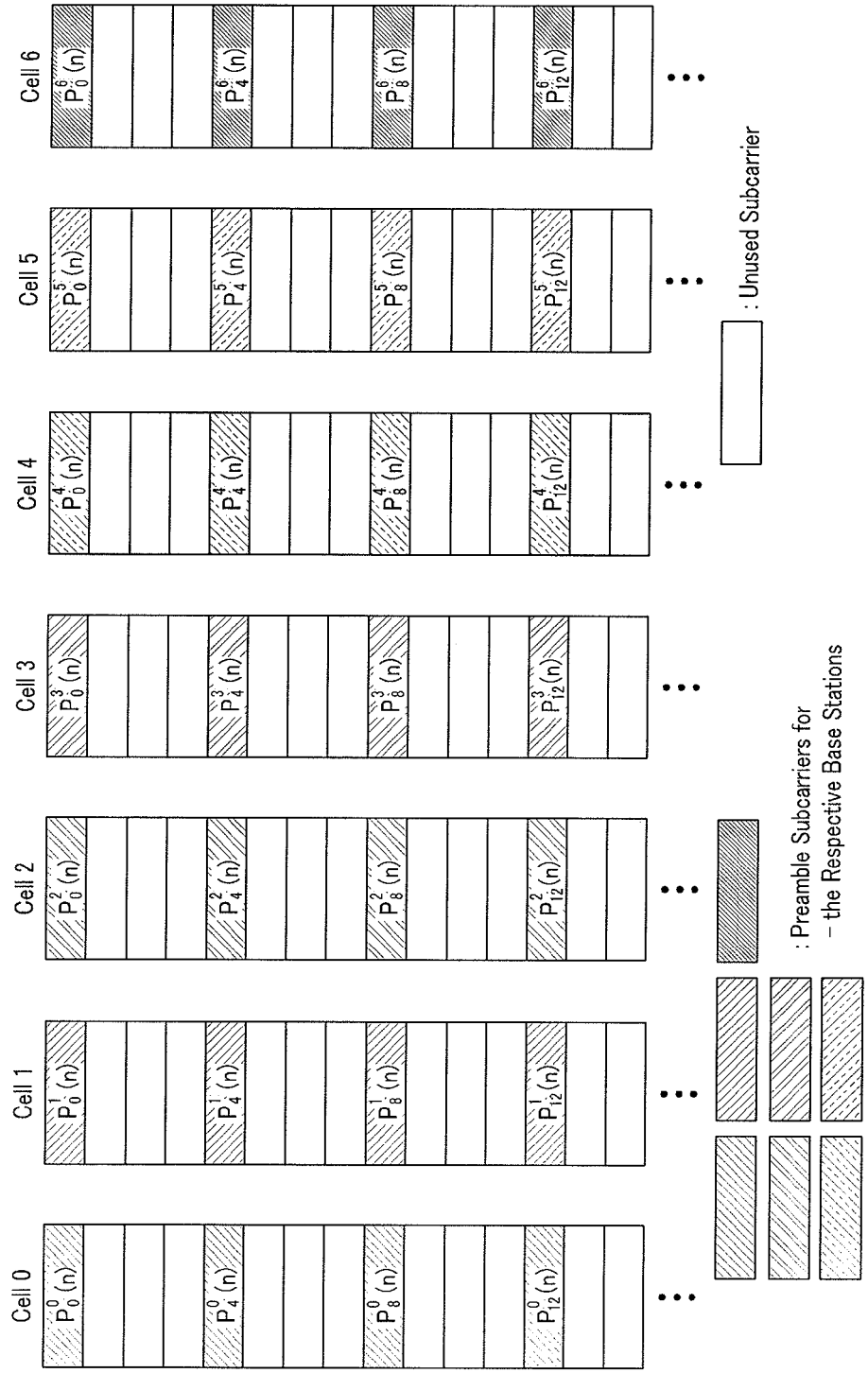
Figure 6:
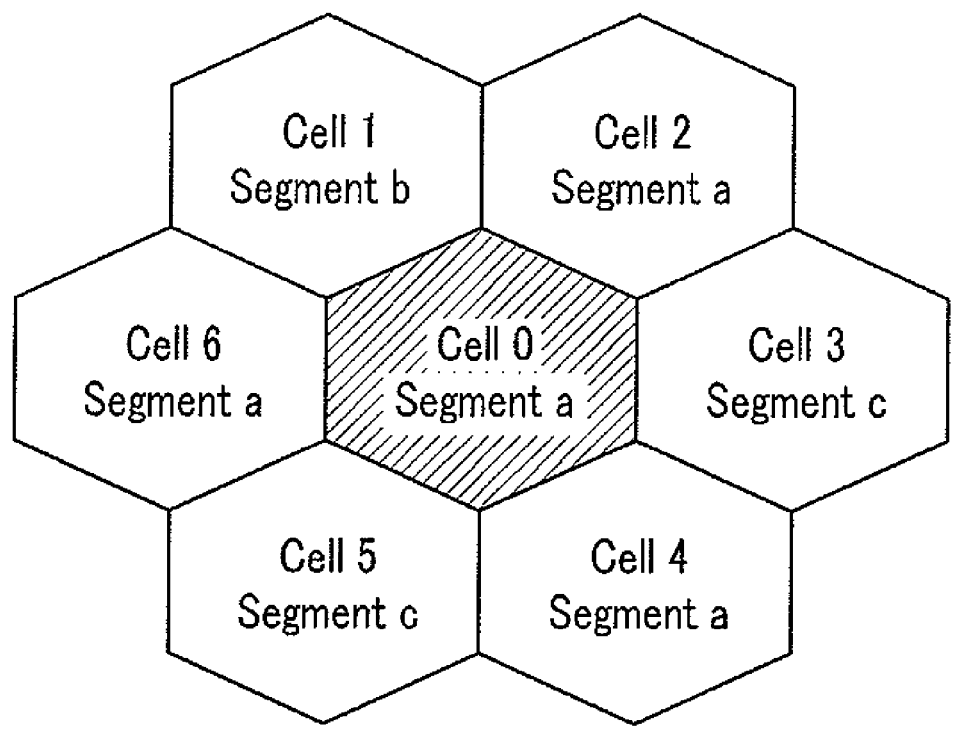
FIGS. 6 and 7 respectively illustrate a cellular system in which a preamble sequence is allocated when respective cells transmit a preamble using a different subcarrier.

For convenience of description, the transmitted preamble is described based on a preamble shown in FIG. 5. At this time, a received signal recognized through a receive preamble symbol 602 is given as Equation 2.

$$r_{4m}(n) = \sum_{q=0}^{Q-1} \sqrt{P_P}\, d_{4m}^q(n) h_{4m}^q(n) + w_{4m}(n) \quad \text{(Equation 2)}$$

$P_P$ is a transmit power of a preamble subcarrier.

When a base station including a receiver is given as an i-th base station, a difference of adjacent preamble subcarriers may be calculated by Equation 3.

$$\tilde{v}_{4m} = r_{4(m+1)}(n)(p_{4(m+1)}^i)*(n) - r_{4m}(s)(p_{4m}^i)*(n) \quad \text{(Equation 3)}$$

$$= \sqrt{P_P}\left(|p_{4(m+1)}^i(n)|^2 h_{4(m+1)}^i(n) - (|p_{4m}^i(n)|^2 h_{4m}^i(n)\right) +$$

-continued $$\sqrt{P_P} \sum_{q=0, q \neq i}^{Q-1} (p_{4(m+1)}^q(n) p_{4(m+1)}^i) * (n) h_{4(m+1)}^q(n) -$$

$$p_{4m}^q(n)(p_{4m}^q(n)(p_{4m}^i) * (n) h_{4m}^q(n)) +$$

$$w_{4(m+1)}(n) p_{4(m+1)}^i(n) - w_{4m}(n) p_{4m}^i(n)$$

In the case of a channel environment in which a delay spread is not very large, it may be assumed that $$|P_{4(m+1)}^i(n)|^2 h_{4(m+1)}^i(n) \approx |P_{4m}^i(n)|^2 h_{4m}^i(n)$$

Through such assumption, Equation 3 is calculated as follows.

$$\tilde{v}_{4m} = \sqrt{P_P} \sum_{q=0, q \neq i}^{Q-1} (p_{4(m+1)}^q(n)(p_{4(m+1)}^i) * (n) h_{4(m+1)}^q(n) - \quad \text{(Equation 4)}$$

$$p_{4(m+1)}^q(n)(p_{4m}^i) * (n) h_{4m}^q(n)) +$$

$$w_{4(m+1)}(n) p_{4(m+1)}^i(n) - w_{4m}(n) p_{4m}^i(n)$$

An interference power and noise power estimator 606 can calculate an interference power and noise power V as Equation 5 using the receive preamble symbol and transmit subcarrier.

$$V = \frac{1}{2M} \sum_{m=0}^{M-1} |\tilde{v}_{4m}|^2 = P_P I + W \quad \text{(Equation 5)}$$

In Equation 5, M is given as a number of a subcarrier to which the preamble transmits a sequence, I is an average of respective normalized subcarrier interference power, and W is an average of noise power.

Since a transmit power estimator 608 outputs $$\frac{1}{M} \sum_{m=0}^{M-1} |r_{4m}(n)|^2,$$

a preamble CINR estimator 610 estimates a CINR of the preamble as Equation 6.

$$CINR_{preamble} = \frac{\frac{1}{M} \sum_{m=0}^{M-1} |r_{4m}(n)|^2 - V}{V} = \frac{P_P S}{P_P I + W} \quad \text{(Equation 6)}$$

In Equation 6, S is given as an average of the subcarrier receive power excluding the normalized interference and the noise. At this time, when the preamble transmit power is the same as the data subcarrier transmit power, that is, $P_P = P_D$, and the preamble estimating CINR is the data area CINR, the data area CINR may be directly estimated from the preamble for estimating CINR. However, an error occurs when the preamble transmit power is different from the data subcarrier transmit power. Such an error will be described in detail with reference to FIG. 9.

In order to correct such an error, a noise power is calculated from the subcarrier not transmitting the preamble sequence using a noise power estimator 604.

A received signal of the subcarrier not transmitting the preamble sequence is given as $r_{4m+g}(n) = w_{4m+g}(n)$, (g=1, 2, 3), and accordingly, the noise power $W_{unused}$ thereof is calculated as follows.

$$W_{unused} = \frac{1}{3M} \sum_{m=0}^{M-1} \sum_{g=1}^{3} |w_{4m+g}(n)|^2$$

At this time, since $W = W_{unused}$, the normalized interference power size is given as $I = (V - W_{unused})/P_P$. As a result, the data subcarrier CINR estimator 612 calculates the average CINR of the data subcarrier as Equation 7.

$$CINR_{data} = \frac{(CINR_{preamble} V)}{(V - W_{unused})/\beta + W_{unused}}, \quad \text{(Equation 7)}$$

$$\beta = P_P / P_D$$

Figure 9:
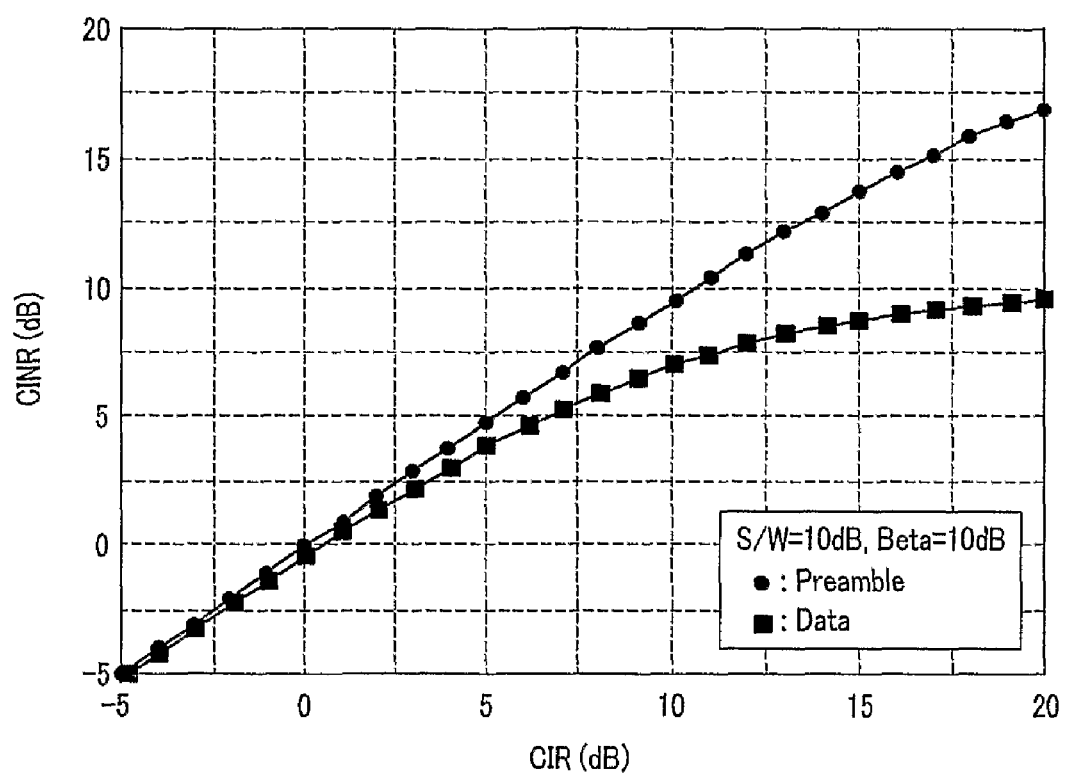
FIG. 9 is an error graph in which the error occurs when a preamble transmit power is different from a data transmit power.

FIG. 9 is an error graph in which an error occurs when a preamble transmit power is different from a data transmit power.

When the estimating preamble CINR is calculated according to Equation 6, S/W=10 dB, and the preamble/data subcarrier power ratio is given as β, as shown in FIG. 9, the preamble is amplified greater 10 dB than the data and accordingly, it is known that error increases as the CIR (carrier to interference ratio) becomes higher.

In order to correct the error generated in this manner, the noise power estimator 604 calculates a noise power from the subcarrier not transmitting a preamble sequence.

In this manner, the CINR can be estimated from the subcarrier not transmitting a preamble sequence when the preamble power is amplified in comparison with the data symbol power.

Meanwhile, when all the preamble subcarriers are used for the data transmission, that is, there is no subcarrier not transmitting a preamble sequence, the CINR estimating method is as follows.

Figure 10:
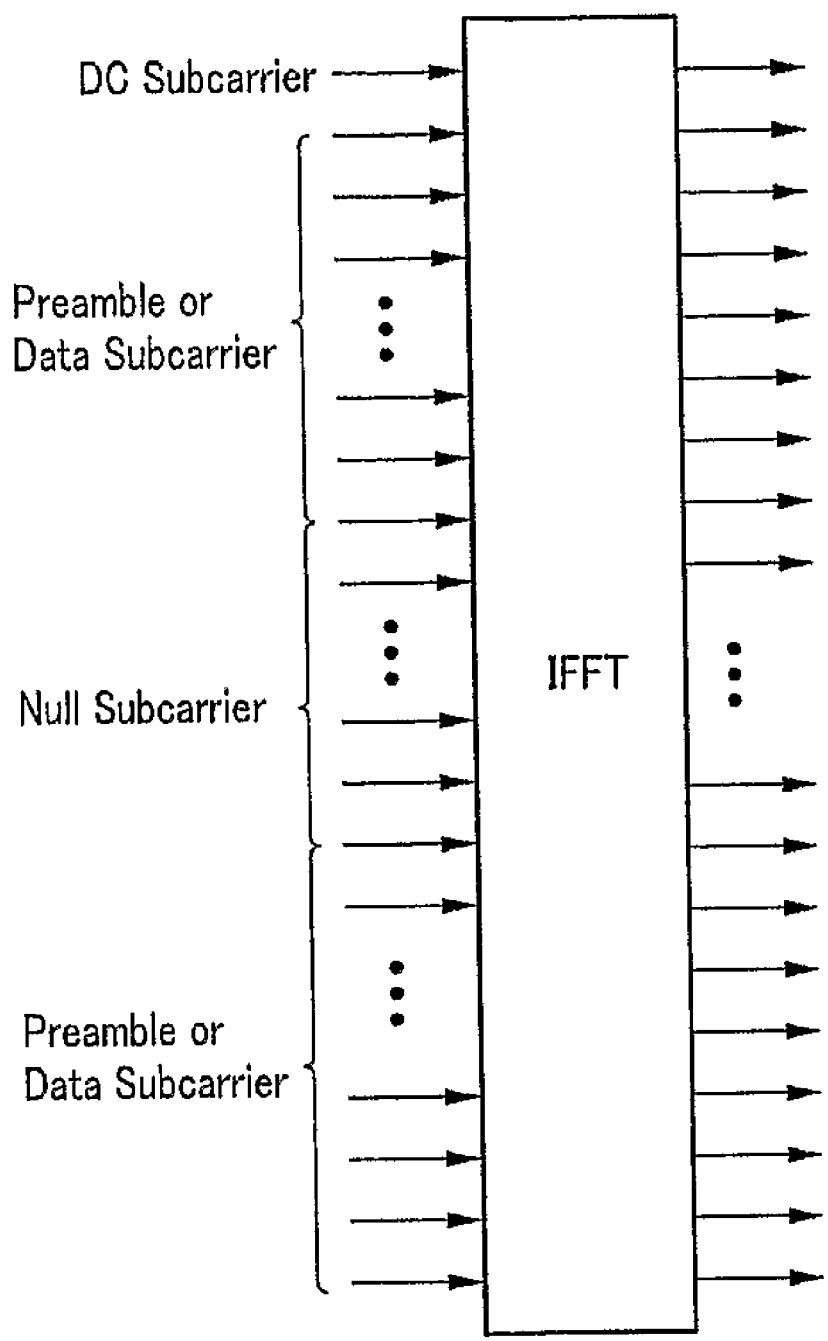
FIG. 10 illustrates a signal input of the IFFT converter for reducing adjacent band interference by inserting a null subcarrier.

FIG. 10 illustrates an IFFT converter signal input for reducing adjacent band interference by inserting a null subcarrier.

In order to reduce the interference of the adjacent bands in the OFDM, a null subcarrier is used in FIG. 10. The IFFT converter 110 receives the DC subcarrier, the preamble or data subcarrier, and the null subcarrier from the multiplexer 108, and performs the Fourier transform. With the IFFT converter and the null subcarrier, the noise power can be calculated.

Figure 11:
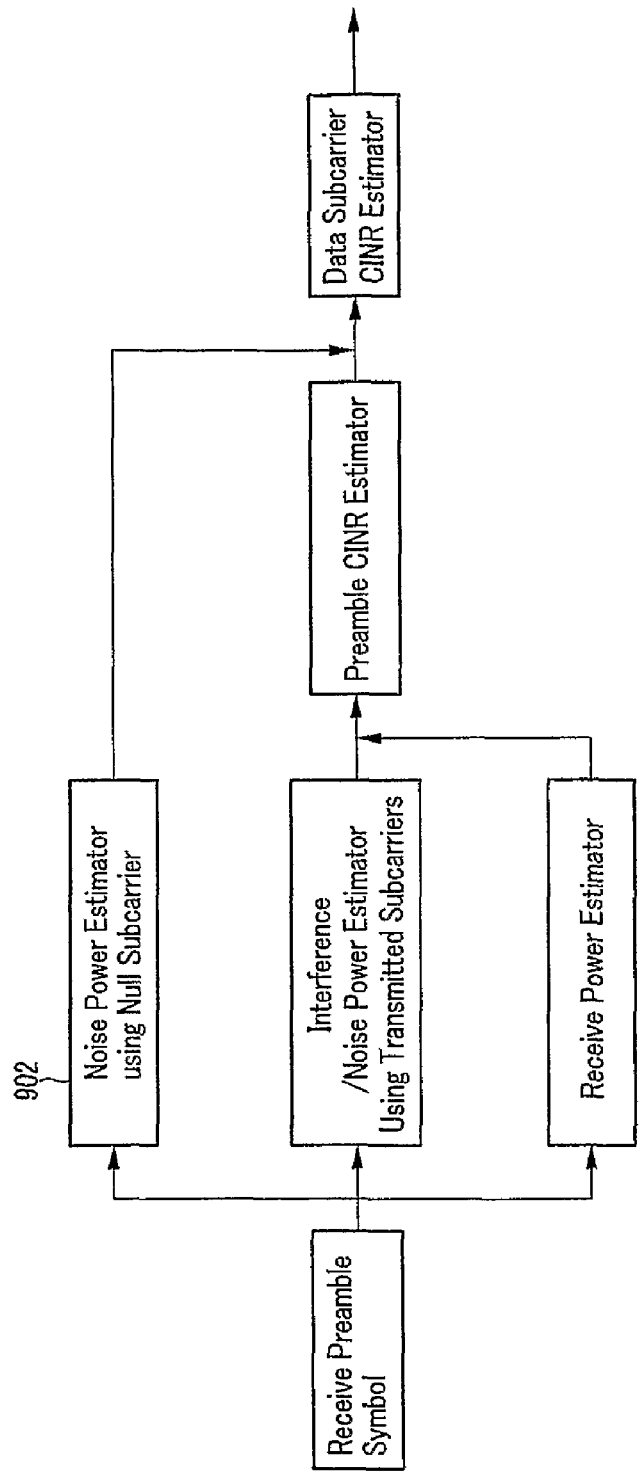
FIG. 11 is a block diagram for estimating a CINR when a preamble transmit power is different from a data transmit power and all subcarriers are transmitted.

FIG. 11 is a block diagram for estimating a CINR when a preamble transmit power is different from a data transmit power and all subcarriers are transmitted.

The CINR estimating method described with reference to FIG. 8 is the same as a CINR estimating method shown in FIG. 11 except for a function of a noise power estimator 604.

That is, when the null subcarrier number is given as Mnull, the noise power estimator 902 estimates a noise power using the null subcarrier, as shown in Equation 8.

$$W_{Null} = \frac{1}{M_{Null}} \sum_{m=a}^{M_{Null}+a} |r_m(n)|^2 \quad \text{(Equation 8)}$$

At this time, rm(n)=wm(n), and a is given as an index of the null subcarrier. Therefore, the data area CINR is calculated as shown in Equation 9.

$$CINR_{data} = \frac{(CINR_{preamble}V)/\beta}{(V - W_{Null})/\beta + W_{Null}}, \quad \text{(Equation 9)}$$

$$\beta = P_P / P_D$$

When all the preamble subcarriers are used for the data transmission according to Equation 9, that is, there is no subcarrier not transmitting a preamble, the CINR can be estimated.

Meanwhile, when the respective base stations use the preambles at different subcarrier positions, the preamble estimated CINR is different from the data subcarrier CINR regardless of the preamble transmit power amplification.

In an OFDMA scheme of IEEE 802.16 described below, the respective base stations use a preamble having a subcarrier at different positions. In IEEE 802.16, a first symbol of a downlink transmission is given as a preamble, and there are three preamble carrier sets. In addition, the three preamble carrier sets respectively have different subcarriers allocated thereon, and the subcarriers are modulated using a predetermined pseudo noise (PN) code and an amplified BPSK modulation.

At this time, the subcarrier allocated to the predetermined preamble is checked as follows.

PreambleCarrierSet$n$=$n$+3×$k$ n is given as a number of the preamble carrier set indexed as 0, 1, and 2, and k indicates the consecutive index established as 0, 1, 2, ..., 567 when the size of the FFT is given as 2048.

In addition, a respective segment is established as a segment 0, a segment 1, and a segment 2, and uses one preamble formed with three available carrier sets. That is, the segment 0 uses a preamble carrier set 0, the segment 1 uses a preamble carrier set 1, and the segment 2 uses a preamble carrier set 2.

Figure 7:
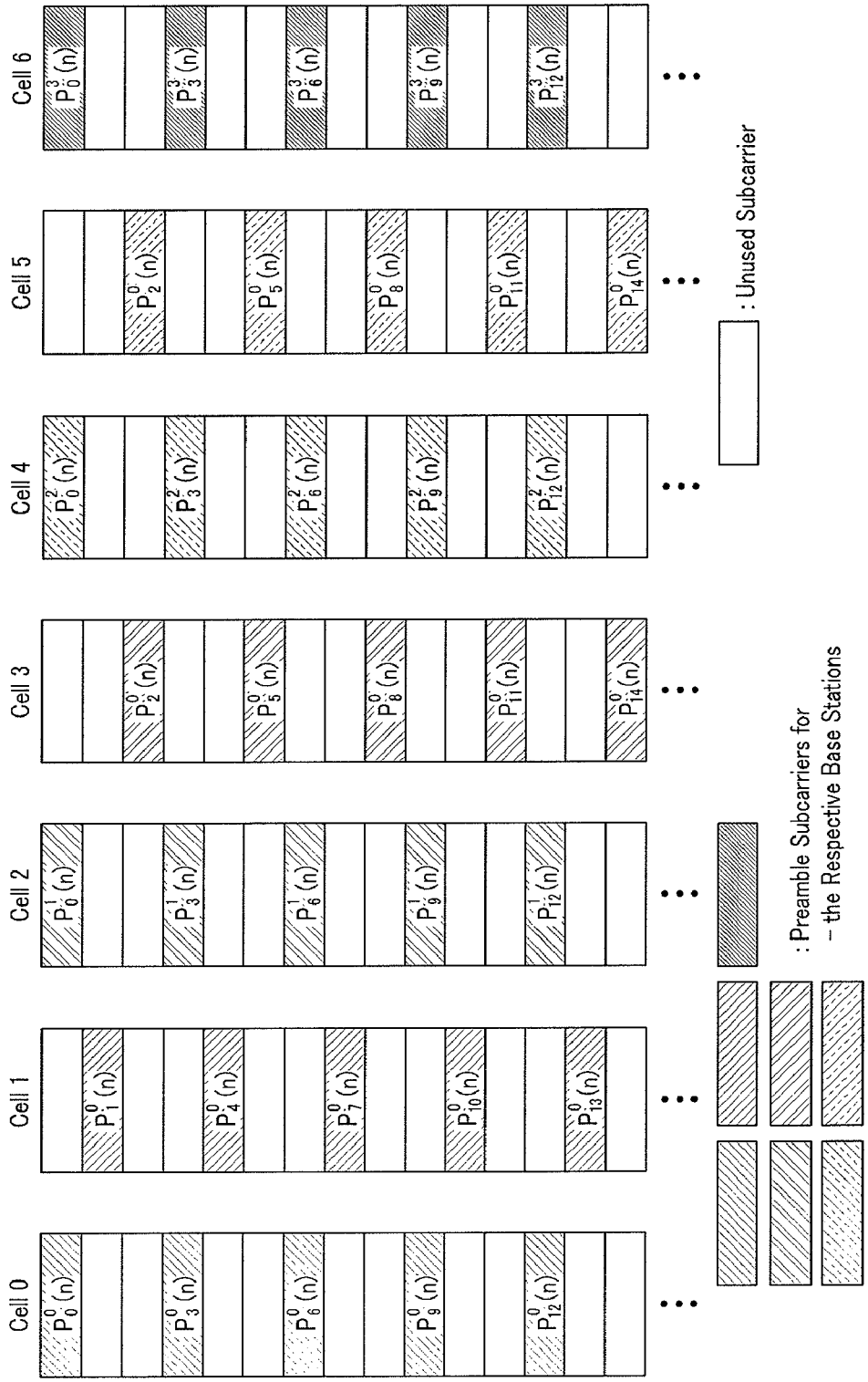

Therefore, in the OFDMA of IEEE 802.16, the respective segments have a third subcarrier modulated as shown in FIG. 7.

Figure 12:
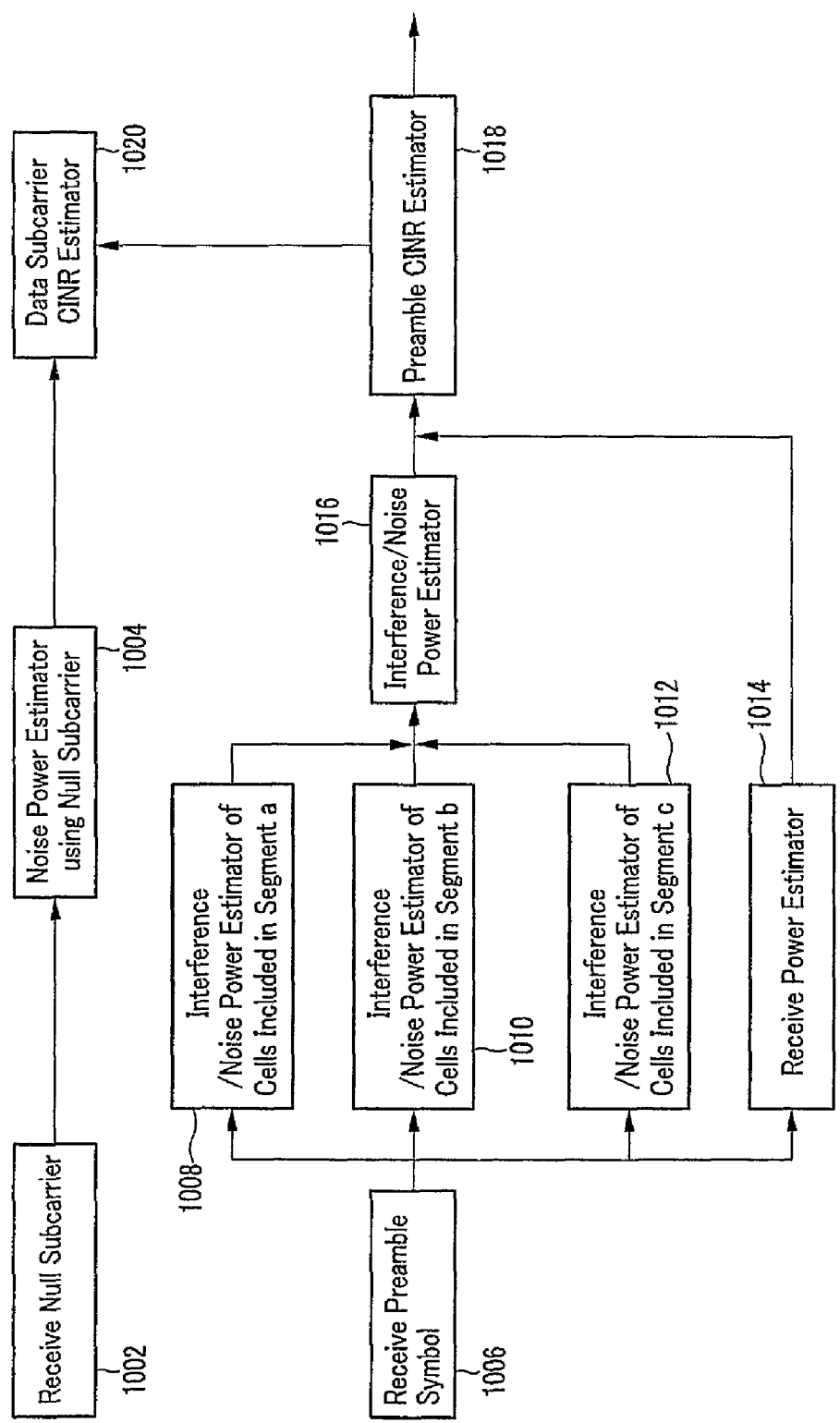
FIG. 12 is a block diagram for estimating a CINR of data when respective base stations have different preamble transmit positions.

FIG. 12 is a block diagram for estimating a CINR of data when respective base stations have different preamble transmit positions.

When the position of the transmitted preamble is different for the respective base stations, the receive preamble subcarrier 1006 and receive null subcarrier 1002 are respectively calculated so as to estimate the CINR of the data.

First, in order to estimate the receive preamble subcarrier 1006, the interference power is calculated from the adjacent cells included in the segment corresponding to the base station including the receiver.

When the receivers are placed on the cells having the segment a, a noise power estimator 1008 calculates the received signal for the subcarriers of the preamble received from the segment a as in Equation 10.

$$r_{a+3k}(n) = \sqrt{P_P} \sum_{q=0}^{q_a-1} p^q_{a+3k}(n)h^q_{a+3k}(n) + w_{a+3k}(n) \quad \text{[Equation 10]}$$

In Equation 10, a is given as one of three segments 0, 1, and 2, k is given as a consecutive index, and qa is the number of adjacent base stations included in the segment a.

At this time, the difference of the subcarriers used at the segment using Equation 3 is the same as that using Equation 11.

$$\tilde{v}_{a+3k} = \quad \text{[Equation 11]}$$

$$\sqrt{P_P} \sum_{q=0, q\neq i}^{q_a-1} (p^q_{a+3(k+1)}(n)(p^i_{a+3(k+1)})^*(n)h^q_{a+3(k+1)}(n) -$$

$$p^q_{a+3k}(n)(p^i_{a+3k})^*(n)h^q_{a+3k}(n)) +$$

$$w_{a+3(k+1)}(n)p^i_{a+3(k+1)}(n) - w_{a+3k}(n)p^i_{a+3k}(n)$$

Therefore, the noise power estimator 1008 estimates the interference power and noise power generated by the segment a as follows.

$$V_a = \frac{1}{2K_1} \sum_{k=0}^{K_1-1} |\tilde{v}_{a+3\times k}|^2 = P_P I_a + W_a$$

At this time, K1 is given as the number of subcarriers transmitting the preamble sequence at the segment a, Ia is given as a normalized interference power, and Wa is given as a noise power.

In addition, the interference power received from the cells having different segment values than the base station including the receiver, that is, adjacent cells having the segment b or segment c, is calculated.

First, the signal received from the cells having the segment b is as follows.

$$r_{b+3k}(n) = \sqrt{P_P} \sum_{q=0}^{q_b-1} p^q_{b+3k}(n)h^q_{b+3k}(n) + w_{b+3k}(n)$$

Therefore, the interference generated by the segment b and the interference and noise power generated by the noise power estimator 1010 are as follows.

$$V_b = \frac{1}{K_2} \sum_{k=0}^{K_2-1} |r_{b+3k}(n)|^2 = P_P I_b + W_b$$

At this time, K2 is given as the number of subcarriers transmitting the preamble sequence at the segment b, Ib is a normalized interference power, and Wb is given as a noise power.

Likewise, the interference generated by the segment c and the received signal and interference and noise power received by the noise power estimator 1012 are as follows.

$$r_{c+3k}(n) = \sqrt{P_P} \sum_{q=0}^{q_c-1} p^q_{c+3k}(n)h^q_{c+3k}(n) + w_{c+3k}(n)$$

$$V_c = \frac{1}{K_3} \sum_{k=0}^{K_3-1} |r_{c+3k}(n)|^2 = P_P I_c + W_c$$

At this time, K3 is given as the number of subcarriers transmitting the preamble sequence at the segment c, Ic is a normalized interference power, and Wc is given as a noise power.

The interferences and noise powers of the segments b and c may also be calculated in a similar manner to the interference determining method of the segment a.

At this time, the interferences and noise powers of the segments b and c are calculated as follows.

$$\tilde{v}_{b+3k} = \sqrt{P_P}\,(r_{b+3(k+1)}(n) - r_{b+3k}(n)) + w_{b+3(k+1)}(n) - w_{b+3k}(n)$$

$$V_b = \frac{1}{2K_2}\sum_{k=0}^{K_2-1}|\tilde{v}_{b+3\times k}|^2 = P_P I_b + W_b$$

$$\tilde{v}_{c+3k} = \sqrt{P_P}\,(r_{c+3(k+1)}(n) - r_{c+3k}(n)) + w_{c+3(k+1)}(n) - w_{c+3k}(n)$$

$$V_c = \frac{1}{2K_3}\sum_{k=0}^{K_3-1}|\tilde{v}_{c+3\times k}|^2 = P_P I_c + W_c$$

When the interference and noise powers generated by the segments a, b, and c are estimated as described above, the interference and noise power of the preamble must be estimated from the interference powers according to the respective segments. An interference and noise power estimator 1016 is used to calculate an entire interference and noise power. The entire interference and noise power (V) is calculated as follows.

$$V = P_P(I_a + I_b + I_c) + W_a + W_b + W_c$$

At this time, since the noise power of the respective segments statistically have the same characteristics, they are satisfied by $W_a \approx W_b \approx W_c \approx W$. When it is given as $I = I_a + I_b + I_c$, the interference and noise power estimator 1016 calculates the entire interference and noise power as in Equation 12.

$$V = V_a + V_b + V_C = P_p I + 3W \quad \text{[Equation 12]}$$

In Equation 12, since the receive power estimator 1014 estimates the receive power as $$\frac{1}{K_1}\sum_{k=0}^{K_1-1}|r_{a+3k}(n)|^2,$$

the preamble CINR estimator 1018 may estimate a preamble CINR as in Equation 13.

$$CINR_{preamble} = \frac{\frac{1}{K_1}\sum_{k=0}^{K_1-1}|r_{a+3k}(n)|^2 - V}{V} \quad \text{[Equation 13]}$$

As such, the CINR of the receive preamble subcarrier is estimated, and the error must be corrected using the null subcarrier. In order to correct the error, the noise power estimator 1004 calculates the noise power Wnull using the null subcarrier by Equation 8.

When the noise power WNul is calculated, the data subcarrier CINR estimator 1020 calculates the CINR of the data area by Equation 9 as Equation 14.

$$CINR_{data} = \frac{(CINR_{preamble}V)/\beta}{(V - 3W_{Null})/\beta + W_{Null}}, \quad \text{[Equation 14]}$$

$$\beta = P_P/P_D$$

The CINRdata calculated through Equations 9 and 14 is given as a CINR of a full loading in which the base station transmits all the subcarriers. However, when the CINR calculated by the full loading is applied to a part loading in which data areas do not use all the subcarriers, the CINR is less than the CINR of the actually part loading, and accordingly an optimum MCS level is not established.

Thus, in the case of the part loading, the CINR of the data subcarriers must be calculated using other methods.

Figure 13:
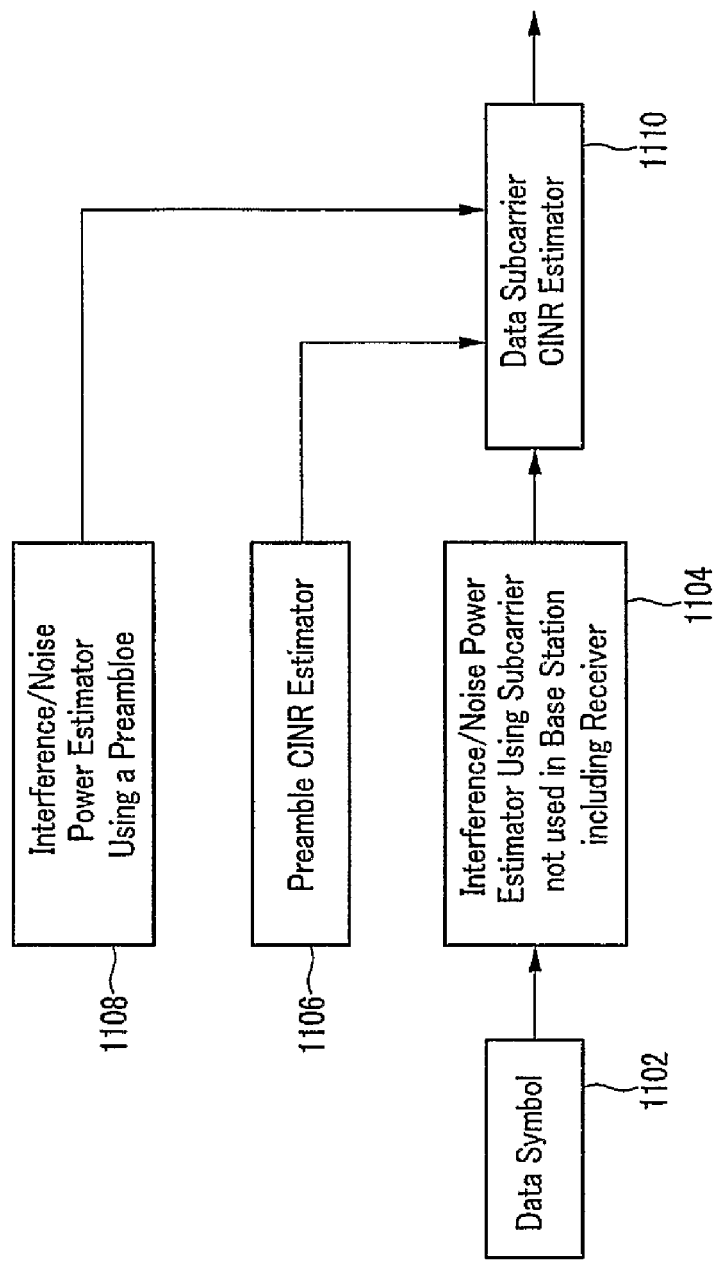
FIG. 13 is a block diagram for estimating a CINR of data when a data area is partially loading.

FIG. 13 is a block diagram for estimating a CINR of data when a data area is partially loading.

The adjacent cell interference power can be estimated when the base stations including the receiver at the data area receiver use the subcarrier not to be allocated to other receivers. At this time, an interference power estimator 1104 calculates a noise power and an average value NID of the interference power of the adjacent cells.

$$NI_D = \frac{1}{JK_{DS}}\sum_{n=j}^{J+j}\sum_{m=0}^{K_{DS}-1}|u_m(n)|^2$$

At this time, it is given that $$u_m(n) = \sqrt{P_D}\sum_{q=0,q=i}^{Q-1}d_m^q(n)h_m^q(n) + w_m(n),$$

which indicates a received signal of an n-th unused subcarrier. In addition, j is given as a symbol number having an unused subcarrier, and m indicates an index after the unused subcarriers are orderly arranged.

In addition, an interference and noise power estimator 1108 and a preamble CINR estimator 1106 can respectively calculate CINRpreamble and V using Equation 5 or 6, and Equation 12 or 13. When the CINRpreamble and V are calculated, the CINR of the data area that is partially loaded can be calculated as Equation 15.

$$CINR_{Partial} = \frac{CINR_{preamble}V}{\beta NI_D} \quad \text{[Equation 15]}$$

As such, when the power is amplified in comparison with the data symbol 1102, the preamble can be used to estimate the CINR using Equations 7 and 9, when the subcarriers are differently applied to the respective cells, the data subcarrier CINR estimator 1110 estimates the CINR using Equation 14, and when the traffic of the data areas is partially loading, the CINR of the data area is estimated using Equation 15.

The above content concerns the CINR estimating method. However, the CINR of Eb(I+No), SINR (signal to interference-plus-noise ratio) or the like can be obtained in the same manner.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to an exemplary embodiment of the present invention described above, a precise carrier to interference-plus-noise ratio (CINR) can be estimated using a preamble when the preamble power is amplified in comparison with the data symbol power, the subcarriers are differently applied for the respective cells, and the traffic of the data area is partially loading.

In addition, a precise carrier to interference-plus-noise ratio (CINR) can be estimated even when the preamble transmit power is different from the data transmit power or at the lower CINR area in which the reliability of the received data is deteriorated.

What is claimed is:

1. A method for estimating a carrier to interference and noise ratio (CINR) when a preamble symbol transmit power is amplified in comparison with a data symbol transmit power, and there are subcarriers not transmitting a preamble at a receiver of an orthogonal frequency division multiplex (OFDM) system, the CINR estimating method comprising:
   (a) receiving a preamble symbol and transmit subcarrier transmitted from a base station and calculating an interference power, a transmit subcarrier noise power and a receive power, the receive power being given as a power value used to transmit a preamble and data symbol at a base station;
   (b) estimating a CINR value of the preamble using the interference power, the transmit subcarrier noise power, and the receive power;
   (c) calculating a non-transmit subcarrier noise power from a subcarrier not transmitting the preamble; and
   (d) calculating an average of the CINR using the CINR value of the preamble and the non-transmit subcarrier noise power.

2. The CINR estimating method of claim 1, wherein at the step (c),
   the non-transmit subcarrier noise power corresponds to an error generated by a difference between the preamble symbol transmit power and the data symbol transmit power.

3. The CINR estimating method of claim 1, wherein at the step (a), assuming that the received preamble symbol is given as $r_{4m}(n)$, the transmit subcarrier transmit power as $P_P$, the number of transmit subcarriers transmitted at the preamble as M, an average of normalized respective transmit subcarrier interference powers as I, an average of the transmit subcarrier noise power as W, the transmit subcarrier interference power and transmit subcarrier noise power as V, and a difference of the transmit subcarriers of a channel environment of which a delay spread is not very large as $\tilde{v}_{4m}$, the transmit subcarrier interference power and transmit subcarrier noise powers are calculated as follows:

$$V = \frac{1}{2M} \sum_{m=0}^{M-1} |\tilde{v}_{4m}|^2 = P_P I + W;$$

and the receive subcarrier power is calculated as follows:

$$\frac{1}{M} \sum_{m=0}^{M-1} |r_{4m}(n)|^2.$$

4. The CINR estimating method of claim 3, wherein at the step (b),
   when an average of the receive powers of the transmit subcarrier excluding the interference and the noise is given as S, the preamble CINR value is calculated as follows:

$$CINR_{preamble} = \frac{\frac{1}{M}\sum_{m=0}^{M-1}|r_{4m}(n)|^2 - V}{V} = \frac{P_P S}{P_P I + W}.$$

5. The CINR estimating method of claim 4, wherein at the step (c),
   when the non-transmit subcarrier noise power is given as $W_{unused}$, it is calculated as $$W_{unused} = \frac{1}{3M} \sum_{m=0}^{M-1} \sum_{g=1}^{3} |w_{4m+g}(n)|^2.$$

6. The CINR estimating method of claim 5, wherein at the step (d), when the transmit power of the data symbol is given as $P_D$, $W=W_{unused}$, and a size of the normalized interference power is given as $I=(V-W_{unused})/P_P$, an average CINR of the data subcarrier is calculated as follows:

$$CINR_{data} = \frac{(CINR_{preamble} V)/\beta}{(V-W_{unused})/\beta + W_{unused}},$$

$$\beta = P_P / P_D.$$

7. A method for estimating a carrier to interference and noise ratio (CINR) when a preamble symbol transmit power is amplified in comparison with a data symbol transmit power, and all the subcarriers are used to transmit a preamble at a receiver of an orthogonal frequency division multiplex (OFDM) system, the CINR estimating method comprising:
   (a) receiving the preamble symbol and transmit subcarrier transmitted from the base station and calculating an interference power, a transmit subcarrier noise power, and a receive power, the receive power being given as a power value used to transmit a preamble and data symbol at a base station;
   (b) estimating a CINR value of the preamble using the interference power, the transmit subcarrier noise power, and the receive power;
   (c) calculating a null subcarrier noise power using a null subcarrier so as to reduce interference of adjacent bands; and
   (d) calculating an average CINR of the data subcarrier using a CINR of the preamble and the null subcarrier noise power.

8. The CINR estimating method of claim 7, wherein at the step (c), the null subcarrier noise power is calculated by performing a Fourier transform for the preamble symbol subcarrier, the data symbol subcarrier, and the null subcarrier.

9. The CINR estimating method of claim 8, wherein at the step (c), assuming that the null subcarrier number is given as $M_{null}$, the null subcarrier index as a, a signal received from the base station as $r_m(n)$, and the null subcarrier noise power as $W_{null}$, the noise power is calculated as follows:

$$W_{Null} = \frac{1}{M_{Null}} \sum_{m=a}^{M_{Null}+a} |r_m(n)|^2.$$

10. The CINR estimating method of claim 9, wherein at the step (d), when the preamble CINR value estimated at the step (c) is given as $CINR_{preamble}$, an average CINR of the data subcarrier is calculated as follows:

$$CINR_{data} = \frac{(CINR_{preamble}V)/\beta}{(V-W_{Null})/\beta + W_{Null}},$$

$$\beta = P_P/P_D,$$

wherein (V) is an interference power and noise power, $P_D$ is a transmit power of a data subcarrier, and $P_P$ is a transmit power of a preamble subcarrier.

11. A method for estimating a carrier to interference and noise ratio (CINR) when respective base stations transmit a preamble from different transmission positions at a receiver of an orthogonal frequency division multiplex (OFDM) system, the CINR estimating method comprising:
 (a) respectively calculating an interference power from adjacent cells having the same segment value as that of a base station including the receiver and adjacent cells having a different segment value;
 (b) estimating an entire interference, a noise power, and a preamble CINR from the respective calculated interference powers;
 (c) calculating a null subcarrier noise power using a null subcarrier so as to reduce respective interferences of adjacent bands; and
 (d) calculating an average CINR of the data subcarrier using a CINR of the preamble and the null subcarrier noise power.

12. The CINR estimating method of claim 11, wherein at the step (a), the segments of the base station have one of segments a, b, and c.

13. The CINR estimating method of claim 12, wherein at the step (b), assuming that an interference power of the segment a is given as $V_a$, a noise power as $W_a$, normalized interference power as $I_a$, the interference power of the segment b as $V_b$, a noise power as $W_b$, normalized interference power as $I_b$, the interference power of the segment c as $V_c$, a noise power as $W_c$, a normalized interference power as $I_c$, and a transmit power of the preamble as $P_P$,
 the $V_a$ is calculated as a $V_a=P_P I_a + W_a$, the $V_b$ is calculated as $V_b=P_P I_b + W_b$, and the $V_c$ is calculated as $V_c=P_P I_c + W_c$.

14. The CINR estimating method of claim 13, wherein at the step (b), assuming that the entire interference and noise power is given as V, the V is calculated as $V=P_P(I_a+I_b+I_c)+W_a+W_b+W_c$.

15. The CINR estimating method of claim 14, wherein the V is given as $V=V_a+V_b+V_c=P_P I+3W$, when $W_a \approx W_b \approx W_c \approx W$ and $I=I_a+I_b+I_c$.

16. The CINR estimating method of claim 11, wherein at the step (b), the preamble CINR is estimated through $$CINR_{preamble} = \frac{\frac{1}{K_1}\sum_{k=0}^{K_1-1}|r_{a+3k}(n)|^2 - V}{V}$$

when the subcarrier number transmitting the preamble at the segment a is given as $K_1$.

17. The CINR estimating method of claim 16, wherein at the step (d), the $CINR_{data}$ is calculated by $$CINR_{data} = \frac{(CINR_{preamble}V)/\beta}{(V-3W_{Null})/\beta + W_{Null}},$$

$$\beta = P_P/P_D,$$

when the null subcarrier noise power is given as $W_{null}$ and the CINR of the data area is given as $CINR_{data}$.

18. A method for estimating a carrier to interference-plus-noise ratio (CINR) when traffic of a data area is partially loading at a receiver of an orthogonal frequency division multiplex (OFDM) system, the CINR estimating method comprising:
 (a) calculating adjacent cell interference powers at a base station including the receiver using subcarriers not allocated to other receivers;
 (b) calculating an interference power and noise power using the preamble symbol and the subcarrier;
 (c) estimating the CINR of the preamble using the interference power and the noise power; and
 (d) calculating a CINR of the partially loaded data area using the interference power, the noise power, and the CINR of the preamble.

19. The CINR estimating method of claim 18, wherein at the step (a), the $u_m(n)$ is calculated by $$u_m(n) = \sqrt{P_D} \sum_{q=0, q=i}^{Q-1} d_m^q(n) h_m^q(n) + w_m(n),$$

and the $NI_D$ is calculated by $$NI_D = \frac{1}{JK_{DS}} \sum_{n=j}^{J+i} \sum_{m=0}^{K_{DS}-1} |u_m(n)|^2,$$

when an average value of the adjacent cell interference power is given as $NI_D$, a received signal of an n-th unused subcarrier as $u_m(n)$, a symbol number having unused subcarriers as j, and an index after which the unused subcarriers are sequentially arranged as m.

20. The CINR estimating method of claim 19, wherein at the step (d),
 the $CINR_{Partial}$ is calculated by $$CINR_{Partial} = \frac{CINR_{preamble}V}{\beta NI_D}$$

when the partially loaded data area CINR is given as $CINR_{Partial}$, the preamble CINR value as $CINR_{preamble}$, the interference power and noise power as V, the transmit power of the preamble subcarrier as $P_P$, the transmit power of the data symbol as $P_D$, and the $P_P/P_D$ value as $\beta$.

21. A device for estimating a carrier to interference and noise ratio (CINR) in an orthogonal frequency division multiplex (OFDM) system, the CINR estimating device comprising:
- a transmit subcarrier interference and noise power estimator for estimating a transmit subcarrier interference power and transmit subcarrier noise power using a received preamble symbol or a subcarrier;
- a receive power estimator for calculating a receive power used to transmit the preamble symbol and data symbol;
- a noise/interference power estimator for calculating an interference power and noise power using at least one of subcarriers not transmitting the preamble symbol, null subcarriers, and subcarriers that the base station does not allocate to other receivers;
- a preamble CINR estimator for estimating a preamble CINR value using the noise power, the interference power, and the receive power; and
- a data subcarrier CINR estimator for estimating a CINR of a data area using the preamble CINR value, the noise power, or interference power estimated by the noise/interference power estimator.

22. The CINR estimating device of claim 21, wherein the noise/interference power estimator calculates the noise power using the subcarriers not transmitting the preamble symbol when the preamble symbol transmit power is amplified in comparison with the data symbol and there are subcarriers not transmitting the preamble symbol.

23. The CINR estimating device of claim 21, wherein the noise/interference power estimator calculates the noise power using null subcarriers when a preamble symbol transmit power is amplified in comparison with a data symbol transmit power, all the subcarriers are used to transmit a preamble, and the respective base stations transmit a preamble from different transmission positions.

24. The CINR estimating device of claim 21, wherein the noise/interference power estimator calculates the interference power using a subcarrier not allocated to other receivers when traffic of a data area is partially loaded.

25. The CINR estimating device of claim 21, wherein the interference and noise power estimator estimates the interference and noise power by calculating the interference power of adjacent cells having the same segment value as that of the base station having the receiver and the interference power of the adjacent cells having different segment values when at least one base station respectively transmits the preamble symbols at the different transmission positions.

* * * * *